United States Patent [19]
Martin et al.

[11] 3,805,629
[45] Apr. 23, 1974

[54] DEVICES FOR LINEAR AND ROTATIONAL MOVEMENTS

[75] Inventors: John F. Martin, South Essex; Roger E. Lemay, Beverly, both of Mass.

[73] Assignee: USM Corporation, Boston, Mass.

[22] Filed: June 1, 1972

[21] Appl. No.: 258,542

[52] U.S. Cl. ............ 74/89.15, 74/424.8 B, 74/479, 108/20, 248/188.4
[51] Int. Cl......................... G05g 11/00, F16h 1/08
[58] Field of Search.... 74/479, 471 XY, 471, 89.15, 74/424.8 B; 108/20, 140, 144; 248/188.4

[56] References Cited
FOREIGN PATENTS OR APPLICATIONS
1,328,909    4/1963    France.......................... 74/424.8 B

*Primary Examiner*—Allan D. Herrmann
*Attorney, Agent, or Firm*—William R. Evans; Vincent A. White; Richard B. Megley

[57] ABSTRACT

A device for linearly and rotationally moving a member relative to an axis of the device has the member mounted on an end of an intermediate column which is operatively connected to an outer concentric column for rotational movement and operatively connected to an inner concentric column for linear movement. The inner and outer columns additionally support the intermediate column against movement transverse of the axis of movement.

4 Claims, 5 Drawing Figures

3,805,629

DEVICES FOR LINEAR AND ROTATIONAL MOVEMENTS

BACKGROUND OF THE INVENTION

Many industrial operations require both a linear and a rotational movement of a member. Frequently, it is desirable to accomplish both movements from a supporting column to avoid surrounding the member to be moved with structures for accomplishing the movement. Similarly, it is often desirable to provide a device with as low an inertia as possible so that the smallest, least expensive motors may be employed to produce the desired movement. It is additionally desirable that at least one of the rotational or linear movements be independent of the other.

Industrial movement devices are particularly suitable to be driven by stepping motors which may be operated to produce precise movements. Accurate starting and stopping of such motors requires as low an inertia as possible to avoid losing or gaining steps uon starting or stopping. Similarly, play must be effectively eliminated from drive members connecting the motor and a member to be moved so that the accurate stepping movement of the motor may be transmitted to the member.

SUMMARY OF THE INVENTION

Accordingly, it is an object of the invention to provide a low inertia device for both linearly and rotationally moving a member with play effectively eliminated from drive members for the movements and in which one movement is independent of the other.

To this end, a device for linearly and rotationally moving a member has an intermediate column on an end of which the member is mounted. The intermedite column is operatively connected to a concentric, outer column mounted for rotational movement and having operatively connected means for producing rotational movement. The intermediate column is also operatively connected to a concentric, inner column for linear movement and the inner column is operatively connected to means for producing the linear movement. The concentric columns provide a low inertia as well as a compact design which does not surround the member to be moved with encumbering structures for producing the movement. At leat one of the linear and rotational movements is independent of the other. A cable is wrapped about one of the columns and provides a rotational moment to the column to effectively eliminate play from drive members for moving the column.

DESCRIPTION OF THE DRAWINGS

A preferred embodiment of the invention which is intended to be illustrative of and not a limitation on the invention will now be described with reference to drawings of the preferred embodiment in which.

DESCRIPTION OF THE PREFERRED EMBODIMENT

Figure 1:
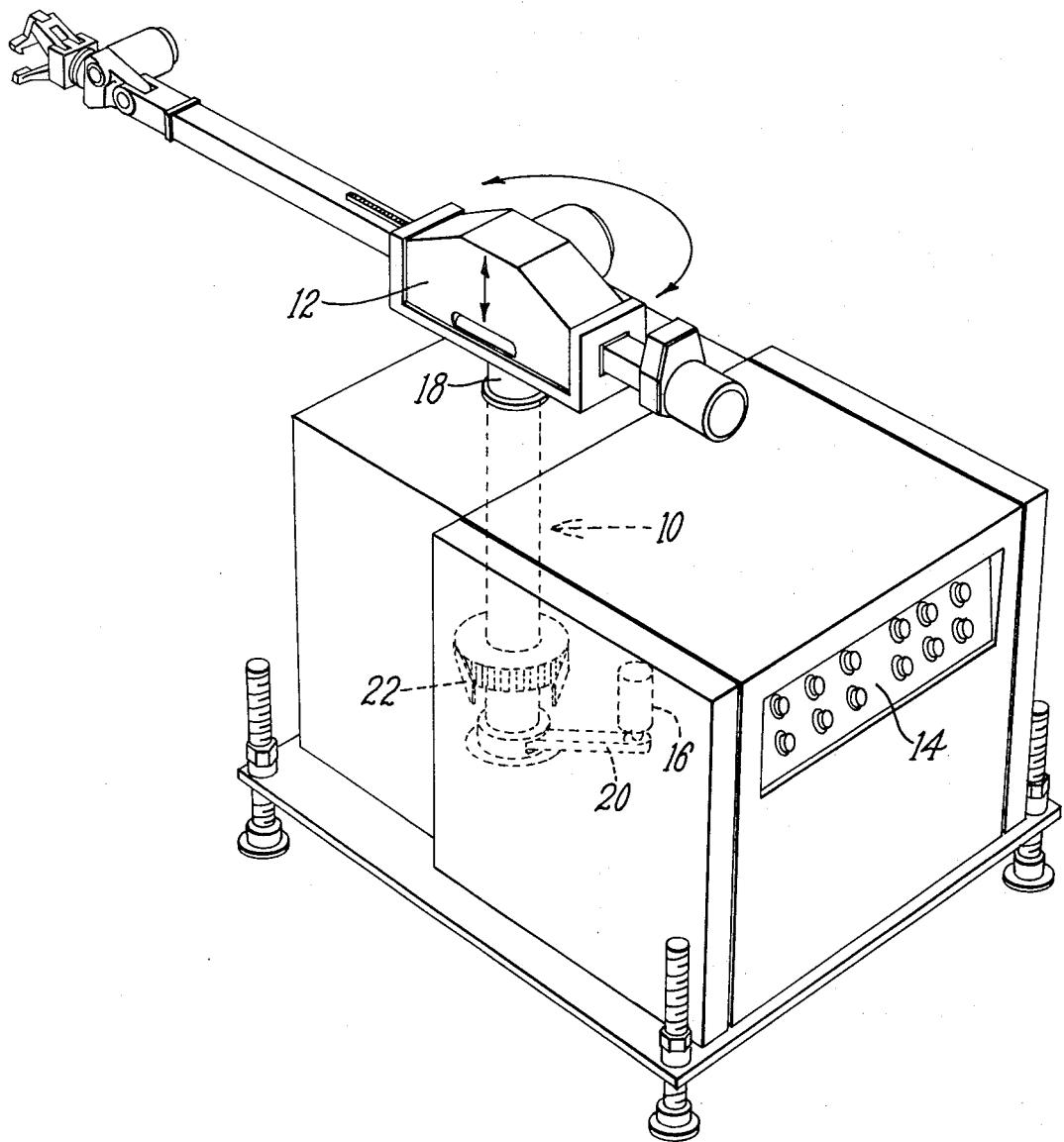
FIG. 1 is a perspective view of apparatus embodying the invention.

As seen in FIG. 1, apparatus including a preferred device 10 embodying the invention generally comprises a member 12 which it is desired to move both linearly (axially) and rotataionally relative to a longitudinal axis of the device supporting the member. A control 14 is connected to stepping motors 16 (only one such motor 16 being shown) to accurately drive the stepping motors a preselected number of steps. The stepping motors are connectd by belts 20 and 22 (FIGS. 1 and 5) to outer and inner concentric columns to provide means for moving the outer and inner columns. The outer and inner columns are operatively connected to an intermediate column 18 of the device which is supportingly connected to the member 12 for linearly and rotationally moving the member.

Figure 2:
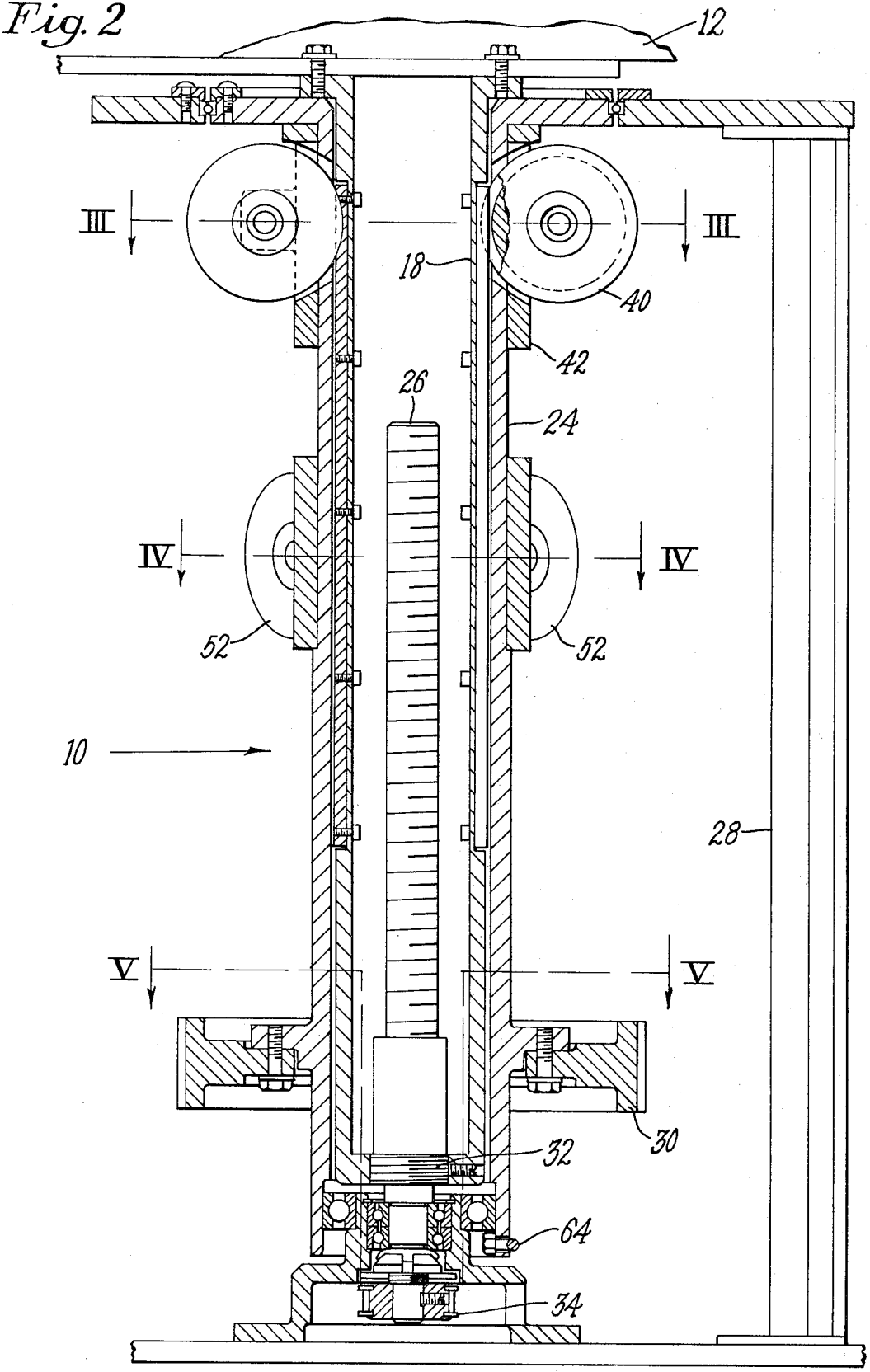
FIG. 2 is a longitudinal cross section of a portion of the apparatus shown in FIG. 1.

For further illustration, FIG. 2 shows the device 10 in longitudinal cross section. A portion of the member 12 is seen to be mounted on an intermediate column 18 extending through the device in coaxial arrangement with an outer column 24 and an inner column 26. The outer column 24 is monted for rotation at both ends in a frame 28 of the apparatus. A belt wheel 30 is secured to the outer column for receiving the belt 22 (FIG. 5) driven by one of the stepping motors to rotate the outer column relative to the frame of the apparatus. The weight of the motor and its associated drive train is not rotated with the outer column and thus does not increase the inertia of the member and column during rotation.

The inner column 26 has external threads in threaded engagement with a ball nut 32 secured to an end of the intermediate column. The inner column also is connected to a belt wheel 34 for receiving the belt 20 (see also FIG. 5) driven by the stepping motor 16 for rotating the threaded column. Because of the threaded engagement of the ball nut with the inner column 26, rotation of the inner column 26 is effective to linearly move the intermediate column.

Figure 3:
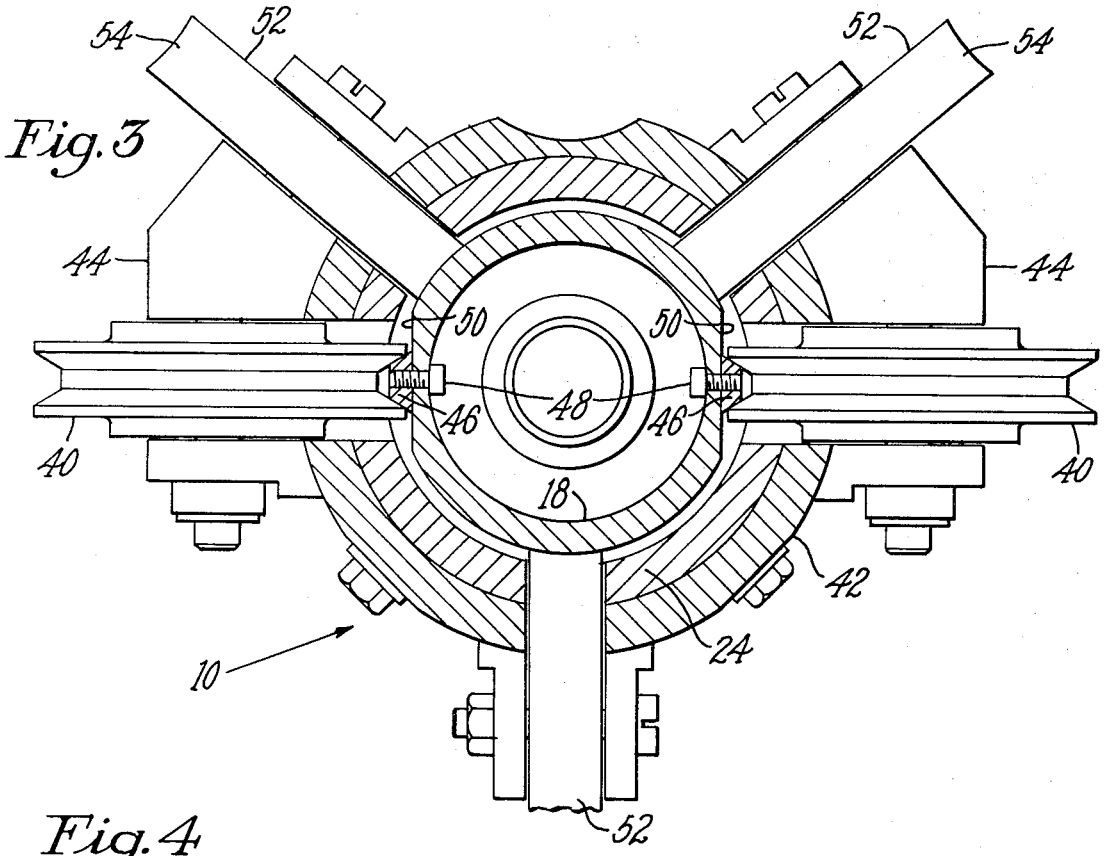
FIGS. 3 and 4 are sections on lines III—III and IV—IV, respectively, of FIG. 2.

FIG. 3 shows in tranverse cross section further details of the means interconnecting and supporting the intermediate column with the outer column for unitary rotation. The outer column is provided with a pair of grooved wheels 40 rotatably mounted on collar portions 44 on diametrically opposite sides of a collar 42 extending around and secured to the outer column. Each of the grooved wheels 40 engages a track 46 secured to the intermediate column as by bolts 48. Engagement of the grooved wheels and track causes the intermediate column to rotate with the outer column. In order to provide space for the track without increasing the spacing between the intermediate and outer columns, a portion of the otherwise cylindrical intermediate column for receiving the track is cut away to provide a flat surface 50 defining a larger space between the intermediate and outer columns than the uncut column walls for receiving the track 46.

Figure 4:
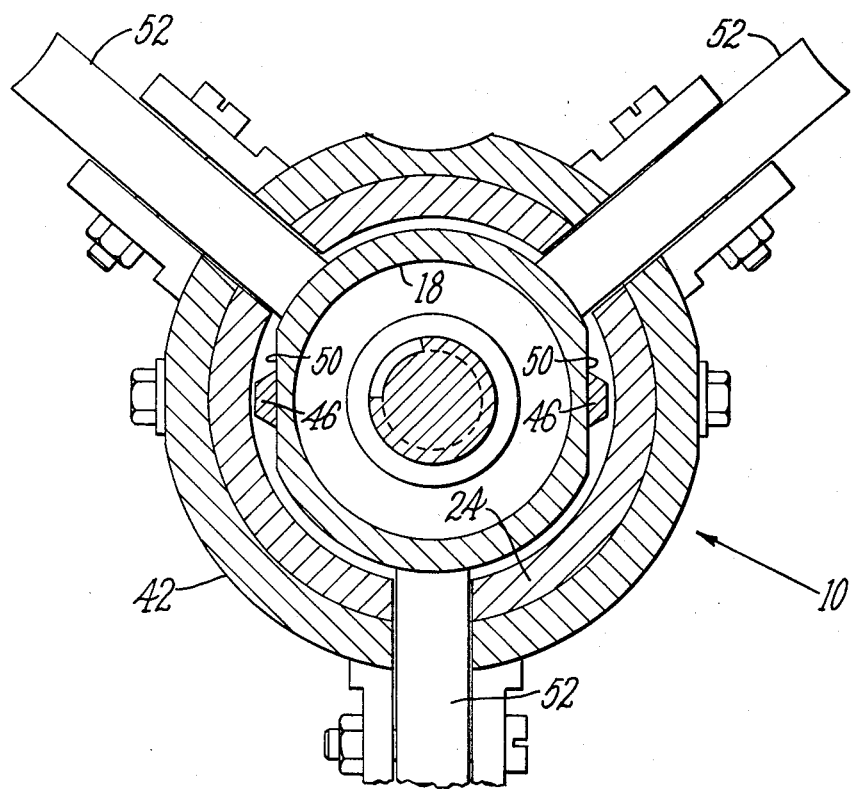

Support of the intermediate column by the outer column is provided by three rollers 52 rotatably mounted on the collar portions 44 at equal distances about the periphery of the outer column. The rollers have contours 54 complementary to the surface of the intermediate column with which the rollers engage to provide firm, abutting support of the intermediate column by the rollers 52. FIG. 4 shows, in transverse cross section, additional support wheels 52 supporting the intermediate column 18. The tracks 46 extend along the surface 50 but are not engaged by additional grooved wheels so as to avoid unnecessary duplication of the function of the wheels 40. The additional support wheels 52, however, insure the coaxial alignment of the outer column with the intermediate column by providing two longitudinally spaced points of support.

It will be seen from the arrangement described that rotation of the outer column is effective, through the operatively connecting means of grooved wheels 40 and tracks 46, to rotate the intermediate column. Rotation of the intermediate column will be effective through nut 32 in threaded engagement with the inner column 26 to linearly move the intermediate column coincident with rotation. Linear movement is thus dependent upon rotational movement whereas the converse is not true. Rotation of the inner column produces only linear movement through the nut 32 and no rotation of the intermediate or outer columns. If such inherently interrelated linear and rotational movement is undesirable, the control 14 may appropriately cause the stepping motor 16 to rotate the inner column in an amount and direction adapted to cancel the amount and direction of linear movement induced by rotation of the intermediate column. Both rotation and linear movement may thus be made effectively independent.

Figure 5:
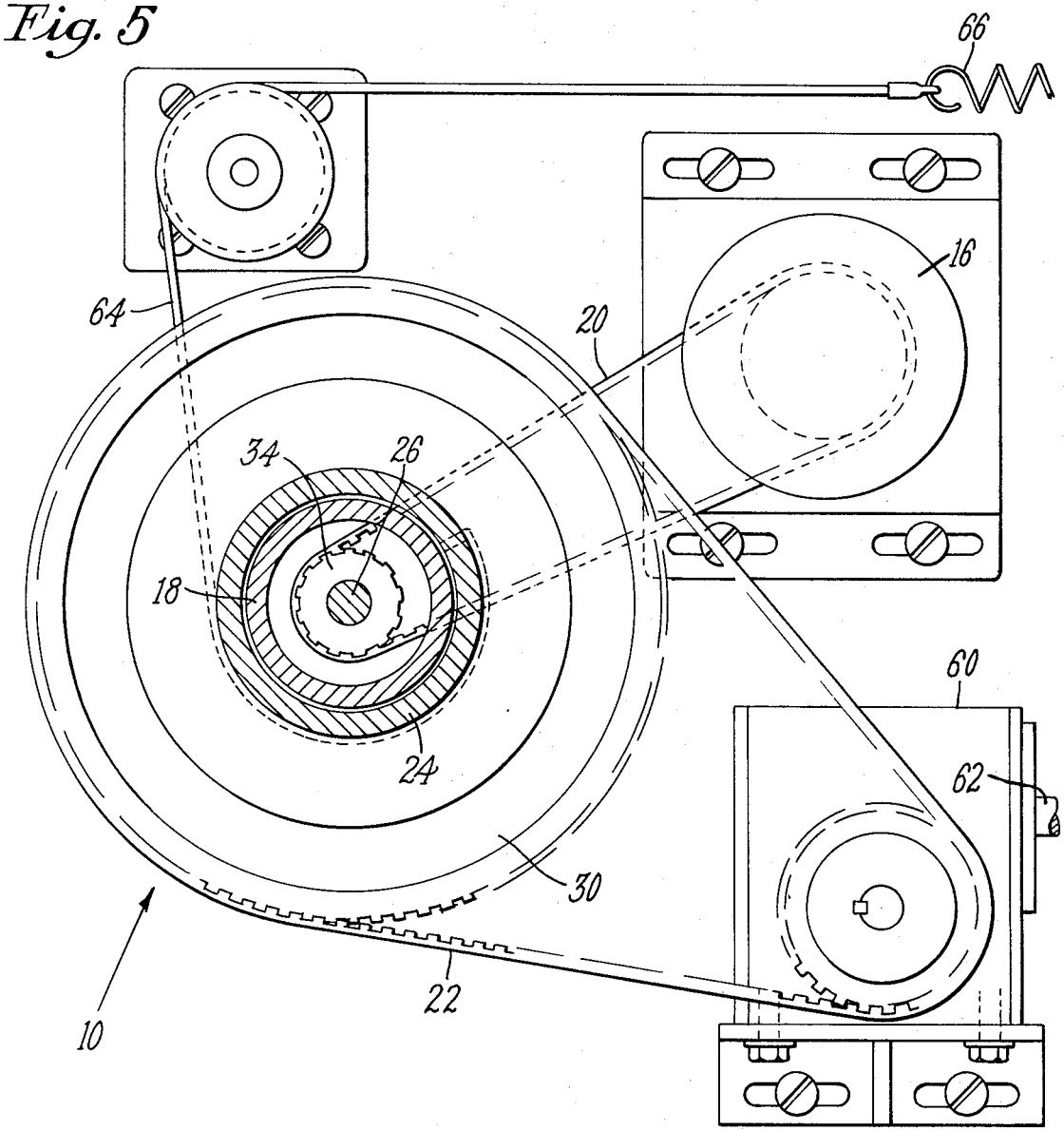
FIG. 5 is a section of a portion of the apparatus in FIG. 1 and taken substantially on line V—V of FIG. 2.

Referring now to FIG. 5, the stepping motor 16 is shown to be connected to the inner column 26 by belt 20 on belt wheel 34. Similarly, the belt wheel 30 of the outer column 24 is seen to be connected by belt 22 to a driving mechanism 60. The driving mechanism 60 is connected by shaft 62 to a stepping motor (not shown) and comprises a gear train including a right angle drive direction change. The gear train of drive mechanism 60 introduces some play between the teeth of the gears comprising the mechanism. Similarly, the teeth of the belt 22 and belt wheel 30 may have some play. Because the rotation is about a horizontal axis, no stability is provided to this play by gravity. Accordingly, accurate rotational positioning of the member 12 on the intermediate column 18 is not possible because the various drive members transmitting movement from the motor to the member randomly vary their position within the tolerances of the play.

A solution to this problem is to bias the engagement of the various toothed members comprising the rotational drive means for the outer column 24 including the gear train in the drive mechanism 60 into a constant orientation. This is done by securing one end of a cable 64 to the outer column, wrapping the cable about the outer column a number of degrees at least equal to the maximum desired degrees it is desired to rotate the outer column and securing the other end of the cable to a spring 66 anchored at its other end to a frame of the device (not shown). Preferably, the spring constant of the spring 66 is such as to cause the spring to provide a constant force to the cable. The force supplied to the cable by the spring tends to rotate the outer column in a clockwise direction as shown in FIG. 5. Actual rotation is resisted by the stepping motor connected to shaft 62 except when the stepping motor rotationally drives the outer column; the cable thus provides a moment torque. The torque moment force orients each toothed member on a side of engagement with its cooperative toothed member to resist the action of the cable. Such oriented positioning of each toothed member eliminates the play from the means for rotating the intermediate column 18 and attached member. Accordingly, accurate positioning of the member is possible. The spring and cable do not add inertia to the rotational system but merely increase the force required to turn the system in one direction and decrease the force required to turn it in the other. The force required, however, is constant rather than the impulse which would be required to overcome inertia.

Alternative embodiments of the invention are contemplated within its scope. For example, the preferred embodiment shows the device as having an inner column for linear movement and an outer column for rotational movement. It is intended, however, that the invention also contemplates the inverse arrangement in which their functions are reversed. Similarly, columns of cross sections other than those illustrated as preferred are contemplated as part of the invention as are other variations embodying the teaching of the invention.

Having thus described my invention, what I claim as new and desire to secure by Letters Patent is:

1. A devie for linearly and rotationally moving a member mounted on the device relative to an axis of the device, comprising:
    an intermediate column on which the member is mounted; an outer column rotatably mounted and concentric with the intermediate column; means operatively connecting the outer column to the intermediate column for unitary rotational movement; an inner column rotatably mounted and concentric with the intermediate column; means operatively connecting the inner column to the intermediate column for linearly moving the intermediate column; and means for rotating the outer and inner columns.

2. A device as in claim 1 wherein the means operatively connecting the outer and the intermediate columns are grooved wheels rotatably mounted on one column and engaging tracks fixedly mounted on the other column.

3. A device as in claim 1 wherein the means operatively connecting the inner and intermediate columns for linear movement is a nut connected to the intermediate column and engaged with threads on the inner column.

4. A device as in claim 1 wherein the means for moving one of the columns comprise cooperatively engaged toothed members and additionally comprising means for effectively eliminating play from the cooperative toothed members.

* * * * *